United States Patent [19]  [11] Patent Number: 4,657,717
Cattanach et al.  [45] Date of Patent: Apr. 14, 1987

[54] FORMING FIBRE-PLASTICS COMPOSITES

[75] Inventors: James B. Cattanach, Middlesbrough; Anthony J. Barnes, Malvern, both of England

[73] Assignee: Alcan International Limited, Montreal, Canada

[21] Appl. No.: 712,009

[22] Filed: Mar. 15, 1985

[30] Foreign Application Priority Data

Mar. 16, 1984 [GB] United Kingdom ............... 8406869
Nov. 27, 1984 [GB] United Kingdom ............... 8429906

[51] Int. Cl.$^4$ ........................................... B29C 43/02
[52] U.S. Cl. .................................... 264/10.2; 264/257; 264/258; 264/292; 264/314; 264/316; 264/324
[58] Field of Search .............. 264/316, 257, 275, 1.9, 264/102, 258, 292, 314, 324; 249/94

[56] References Cited

U.S. PATENT DOCUMENTS

| | | | |
|---|---|---|---|
| 1,312,789 | 8/1919 | Kempton | 264/316 |
| 1,359,919 | 11/1920 | Reardon | 264/316 |
| 1,587,462 | 6/1926 | Adams et al. | 264/316 |
| 2,353,996 | 7/1944 | Cooke et al. | 264/316 |
| 3,140,325 | 7/1964 | Graff | 264/316 |
| 4,301,099 | 11/1981 | Broeksema et al. | 264/316 |
| 4,381,098 | 4/1983 | Delfino | 249/94 |
| 4,390,489 | 6/1983 | Segal | 264/316 |

FOREIGN PATENT DOCUMENTS 535611 4/1941 United Kingdom ............... 264/316
1461317 1/1977 United Kingdom .

Primary Examiner—James Lowe
Attorney, Agent, or Firm—Browdy and Neimark

[57] ABSTRACT

A plastics composite of fibres in a thermoformable matrix is formed by contacting the composite with a sheet of metal and deforming the metal plastically. The thermoformable matrix may be thermoplastic or thermosetting and the metal may be superplastic. The matrix may be deformed between the sheet and another sheet or between the sheet and a mould. Thin bodies of complex shape may be formed.

22 Claims, 12 Drawing Figures

FORMING FIBRE-PLASTICS COMPOSITES

BACKGROUND OF INVENTION

This invention relates to methods of forming of shaped articles of plastics composites comprising fibres dispersed in a matrix of a plastics material.

Composite materials consisting of plastics reinforced by continuous fibres, such as carbon and boron fibres, may be used for making articles having a high strength to weight ratio and desirable properties of stiffness and endurance. Articles made from such composites are increasingly used in the aerospace industry. One type of composite comprises fibres dispersed in a thermoplastic material such as a polyaromatic polyether ether ketone, known as PEEK available from Imperial Chemical Industries plc under the Victrex trade mark. Another type of composite comprises fibre-reinforced thermosetting materials and these are widely used in aerospace and other industries. Composites containing thermoplastic materials have the advantage over composites containing thermosetting plastics that solidification of the plastics material is reversible and a body of the solid composite may be deformed to a desired shape by heating the composite to a temperature at which the plastics material is deformable, followed by forming to shape and cooling. This operation may be repeated and allows articles made of the composite to be repaired; alternatively the composite material can be recycled.

The extent to which a body of fibre/plastics composite may be deformed when hot depends essentially on the arrangement of fibres, which are generally inextensible, in the body. The composites are commonly made as sheets in the form of superposed layers of continuous fibres, in which the fibres of a layer may be woven together and the fibres are impregnated so that individual filaments of the fibre are surrounded and contacted by the plastics material. When the sheet is deformed by bending and/or stretching when hot, the plastics material flows to acquire the new shape of the sheet, but it is also necessary for the structures formed by the fibres to adapt themselves to the new shape. Imperfect adaptation by the fibres can lead to faults of shape and/or unsatisfactory mechanical properties in the shaped article. Some conventional methods of forming cause "buckling" of the fibres which are in compression after deformation, generally on the concave side of a bend; also movement of one layer of fibre relative to the next may produce delamination.

In the case of fibre/thermosettable polymer composites the problem of producing shaped articles containing continuous fibres is less of a problem when the thermosettable polymer is a low viscosity curable resin, because the resin impregnated fibres are flexible and non-rigid intermediate products which can be accommodated in shaped moulds more readily. These systems do however suffer from the disadvantage that long curing cycles are necessary so that the productivity from the moulding equipment is low. The problem of forming reinforced intermediate thermosettable products is however very significant when the thermosettable polymer is not a low viscosity resin but is of sufficiently high viscosity to confer rigidity on the intermediate composite to be shaped and cured. This is the case when the thermosettable material is a solid which has been impregnated into the fibre structure by a solution process, with the solvent subsequently being removed. Such products are stiff, board-like materials which cannot be used in the manner of the low viscosity resin/fibre composite materials to conform to the shape of the mould. The present invention provides a method of forming such board-like intermediate products. The method can also be applied with advantage to the low viscosity resin/fibre intermediate products.

SUMMARY OF INVENTION

According to one aspect of the invention there is provided a method of forming a shaped article of a plastics composite comprising fibres dispersed in a matrix of a thermoformable material in which a body of said composite is contacted on at least one side of the body by a sheet of a metal which is capable of being plastically deformed at an elevated temperature, and the sheet is urged against the side of the body whilst the sheet is at a temperature at which it can be plastically deformed and the plastics body is at a temperature at which it will conform to the shape of the sheet. The sheet is preferably of a superplastic metal, such as a superplastic aluminum alloy of the kind described in British Pat. Nos. 1387586 and 1445181.

The thermoformable material may be a thermoplastic or a thermosettable material. In the case of a thermoplastic polymer matrix, the thermoplastic should be at a temperature at which it is plastically deformable. In the case of a thermosetting matrix which has such a viscosity at ambient temperature such that the composite body is a stiff rigid body, the temperature must be sufficient to reduce the viscosity of the stiff thermosettable matrix to enable the matrix to flow when subject to deformation applied through the metal sheet. In the case of a fluid thermosettable resin matrix, the body will already be readily deformable at ambient temperature. In the latter case the invention gives advantages at the curing stage.

Although any thermoplastics material may be used as the matrix, the invention is of particular interest when the thermoplastics is an aromatic polymer of high thermal stability such as poly aryl ketones, polyamides, polyesters, polysulphones, polyethersulphones, poly arylene sulphides, thermoplastic polyamides, polyetherimides and polyamide-imides. The thermosetting materials include epoxy resins and resins of higher thermal stability such as vinyl polyester resins, polyimides, particularly those derived from bismaleimides, phthalocyanine resins, polystyrylpyridines, acetylene terminated imides and nadic terminated imides.

The method is particularly useful when applied to composite bodies in the form of sheets having a thickness of 0.25 to 25 mm. The length and width of the body will depend on the size of equipment available for pressing or deforming. Sheets of dimensions 5 m × 3 m can be handled in commercially available equipment.

Whilst the method is particularly useful for forming shaped articles in which the fibres are continuous in the sense of extending across the length or width of the sheet the method is also useful when the fibres are present in shorter lengths for example fibres having a length of at least 3 mm.

The method can be applied in a variety of ways and in some embodiments shaping equipment of the kinds described in British Pat. Nos. 1461317 and 1552826 may be used. In a first embodiment the method can be applied to preferred, consolidated bodies such as composite plastics sheets containing superimposed layers of continuous, aligned fibres optionally woven so that a shaped article is obtained from a substantially flat composite sheet by deforming the sheet so that it has curvature about at least one axis in the plane of the flat sheet. In this embodiment the composite sheet may be urged into a female mould by pressure acting on the metal sheet or urged over a male mould.

In a second embodiment the process can be used to form and consolidate the body from thin prepreg sheets, whilst simultaneously deforming the assembly of prepreg sheets into a shaped article. The thin prepreg sheets in this embodiment may be laid up prior to consolidation by superimposing prepreg sheets with the fibre oriented in chosen directions so that the reinforcing fibres provide quasi-isotropic reinforcement in the plane of the sheet. Alternatively, strips of prepreg may be laid up in woven fashion to provide one or more woven sheets to be consolidated. Suitble prepreg materials and methods of producing such materials are described in European Patent Publication No. 56703. Thermosettable prepreg materials, particularly of the board-like type, may also be used.

In a further embodiment the shaped article produced may be in the form of a flat sheet which is produced by consolidating prepreg materials, as described in the second embodiment of the invention. Alternatively, in the case of thermoplastic products, the method may be used to produce a flat sheet having an improved degree of consolidation and surface finish from a preformed sheet which has been consolidated between conventional metal platens which do not plastically deform at elevated temperature. In this method a plastically deformable metal sheet is used to urge and consolidate the flat sheet against a rigid platen surface.

In all of these embodiments at least one sheet of plastically deformable metal should be employed, the assembly of composite sheet and metal sheet or sheets being termed a "sandwich". In the case of the deformation of a preformed body of reinforced composite to a shaped article having curvature a single sheet of metal may be urged against the surface of the preformed body at appropriate temperatures, contact between the metal sheet and the body being maintained by appropriate pressure means. The preformed body may be deformed into a female mould. It is possible to employ two plastically deformable metal sheets, one on either side of the body. When the other sheet is not metal it should be a material which will conform to the shape conferred on the body by plastic deformation of the metal sheet and should have a level of thermal stability suitable for use at the elevated temperatures employed.

When both sheets are of plastically deformable metal it is not always necessary to deform the composite sandwich against a female mould surface and useful shaped articles in the form of a freely blown dome can be obtained.

When the method is used to form a shaped article having curvature the composite body is supported by at least one metal sheet so that buckling of the fibres is inhibited while the fibres are organised to the new shape of the body. An accurately shaped composite body may thus be obtained without loss of the desirable mechanical properties of the composite.

The body of plastics composite may be a sheet having layers of fibres arranged in the plane parallel to the metal sheet. The sandwich may be deformed by stretching of the metal sheet, which may if desired be superplastically deformable at the deformation temperature used. The edges of the composite body are preferably left free to move in the direction parallel to the sheet. As the sandwich is deformed the fibres of the composite may then move to accommodate themselves to the new shape of the body.

The invention is particularly useful for forming shaped articles of non-uniform thickness which would be difficult or impossible to consolidate or to deform using rigid flat platens or matched moulds. The use of a plastically deformable metal sheet enables the sheet to conform with and be urged against the irregular surface of the body, the other surface being restrained by a rigid flat surface or a male or female mould surface.

The shaping method according to the invention may be applied to a flat body of composite material but it may also be applied to bodies of composite material which already have a curvature. When the body is to be formed to a complex shape, especially when it has curvatures about more than one axis, the degree of deformation of the sandwich, starting from a flat sandwich, may vary considerably between different locations of the sandwich. If the sandwich has an appropriate curvature initially the variation in deformation across its area may be reduced substantially.

The shaping method may be applied to a single, continuous body of composite material or to a body formed of thin sheets of composite which are laminated together. It may also be applied to a composite body which is initially built up of separate pieces of fibre/plastics composite. The pieces may be cut and/or bent or folded to make a body of the required initial shape by "Origami" techniques. This method may be used, together with a mould of appropriate shape, to form a composite body of more or less any shape. For example, a tube of composite of circular, elliptical or any other cross-section may be made by applying curved sheets of the fibre/plastics composite material as a layer to the interior surface of a tubular mould and providing the deformable sheet as an inflatable gas-tight metal diaphragm or parison which fits into the mould inside the composite layer. On application of heat to the assembly thus formed and pneumatic pressure inside the parison the latter expands with plastic deformation and presses the composite material against the inside of the mould to form a tube.

When the composite body is made up of more than one piece the pieces are consolidated together during deformation.

The method of the invention may also be used for joining to the composite body members which are not themselves plastically deformed or consolidated during urging of the sheet against the body. For example, it may be desired to provide a surface of the shaped composite body with upstanding brackets or webs having flanges which are embedded in the composite body. Such members may be accommodated in suitably shaped slots or grooves in the surface of a mould to which the composite is applied and extend into the composite body and become anchored within the body as the shaped body is formed. The preconsolidated members may be placed in slots in the mould surface and held therein by pressure exerted by a tool as the shaped body is formed.

Under certain circumstances it may be desired to make shaped articles of composite having edges of positively controlled shape and position. This may be the case, for example, when the composite is to be shaped into a curved sheet having holes of predetermined location, size and shape. Such control may be exercised by providing the surface of the deformable sheet with upstanding portions which come into contact with the opposed surface of the opposite deformable sheet, or the opposed surface of a mould against which the composite is applied, so that the composite cannot enter the area defined by the upstanding portions during the deformation process. Instead of providing the upstanding portions on the deformable sheet, they may be provided on the mould surface instead when no deformable sheet separates the composite from the mould surface. The upstanding portions may define holes in the shaped composite body or they may define a peripheral outer edge of the body. When the sandwich has deformable sheets on both sides of the composite the upstanding portion of one sheet may extend through a corresponding hole in the opposite sheet.

The temperature at which the sandwich is deformed depends on the identity of the plastics materials used. In the case of thermoplastic materials the temperature must be high enough to allow the thermoplastic material to be deformed plastically and give satisfactory bonding of the fibres after deformation. In the case of PEEK, a deformation temperature from 340° C. to 420° C. may be used. However it may be possible to deform the sandwich at a temperature below the melting point of the thermoplastic. With semi-crystalline thermoplastics such as PEEK the lowest usable temperature is generally determined by the recrystallization behaviour of the material.

The sandwich may be deformed by a fluid pressure differential such as gas pressure, the application of mechanical pressure or by a combination of these methods. When a pressure differential is applied to one side of the sandwich having two metal sheets but not the other the metal sheet remote from the pressure application may be perforated to ensure that any gases trapped in the sandwich are released.

Alternatively, the space between the two sheets can be evacuated to remove gases. In addition, if the vacuum (the word vacuum as used herein is any reduced pressure below ambient pressure) between the two sheets is sustained whilst the sandwich is being deformed, this will maintain a consolidating force upon the plastics/fibre composite additional to any consolidating force resulting from the stretching of the metallic sheet. After deformation, in the case of thermoplastics materials the sandwich is allowed to cool so that the deformed composite body is "fixed" in shape. In the case of thermosettable materials the sandwich will normally require to be maintained at an elevated temperature, after the deformation operation, to effect a complete cure of the resin. Application of the pressure used in deformation may be continued after deformation and during at least the first stage of cooling or curing so that the body is retained under pressure as it cools in order to avoid possible delamination of the composite body during cooling.

Cooling of the composite body after shaping may take place while the body is still within a mould or press in which it has been deformed to shape; alternatively the body, still in contact with the deformable sheet or sheets, may be removed from the mould or press while still hot so that it may cool at a faster rate. It is then possible to control the rate of cooling of the shaped composite by controlling the temperature of its surrounding environment and such controlled cooling may be used to control the mechanical properties of the composite body obtained. These properties may, for example, depend on the relative proportions of crystalline and amorphous species in the plastics material and cooling at a controlled rate may allow these proportions to be controlled.

In one possible method of forming the shaped article the composite material to be shaped is placed between the two deformable sheets which are joined at their peripheries by a rigid gas-tight frame so that the frame and sheets form a gas-tight enclosure. The frame is provided with one or more apertures connected by an umbilical to a source of vacuum and the sheets with the composite between are deformed in a press or mould while a vacuum is maintained between the sheets. After shaping the enclosure is removed from the press or mould and allowed to cool while the vacuum in the enclosure is maintained. The vacuum then exerts a consolidating effect during both the shaping and the cooling steps.

During deformation of the sandwich there is generally a degree of slip between the composite body and the metal sheets and a lubricant may be applied to the inside sheet surfaces to facilitate slip.

After cooling of the sandwich the sheets may be removed to obtain the shaped article of fibre-plastics coposite and before assembly of the sandwich a release agent may be applied to the inside surfaces of the metal sheets to facilitate removal. However the method of the invention may be applied to fabrication of shaped fibre-plastics bodies which are bonded on one or both sides to metal sheets and in this case one or both sheets are retained attached to the body after cooling. An adhesive, and not a release agent, may then be applied to the appropriate metal sheet on assembly of the sandwich to bond the shaped body firmly to the plate.

The plastics composite to be formed to shape may be in direct contact with the plastically deformable sheet or sheets during deformation or it may be separated therefrom by a further layer of material which is deformed together with the composite and deformable sheet. This further layer may become permanently attached to the plastics composite before or during deformation. It may for example comprise an unfilled polymer film for improving the surface finish of the shaped article or for other purposes. It is also possible to incorporate a sheet or film of unfilled plastics material within the body of composite material.

A particular advantage of the use of the invention with thermosettable materials is that the deformable metal skin or skins provides a rigidifying support which can retain the shape of the deformed body even though the thermosettable material is not completely cured. This is of particular advantage with the low viscosity resin systems because it provides a means of reducing the time during which the shaped article needs to be kept in the mould, thus improving equipment utilisation. Thus final cure of the shaped article can take place on the rigidifying metal support in an oven at an appropriate temperature. Methods of forming a shaped body of fibre-plastics composite will be described by way of example with reference to the accompanying drawings.

DESCRIPTION OF PARTICULAR EMBODIMENTS

Figure 1:
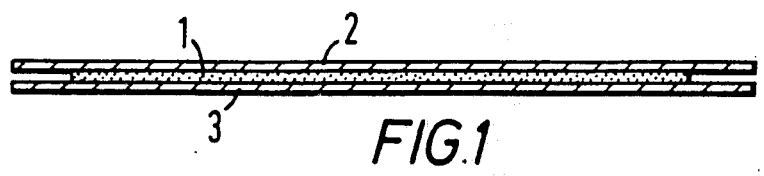
FIG. 1 shows a sandwich comprising a sheet of fibre-thermoplastics composite between two metal sheets.

Referring to FIG. 1, a sheet 1 of fibre-thermoplastics composite sold by Imperial Chemical Industries plc under the designation APC-1 and comprising layers of carbon fibre bonded in a matrix of polyaromatic polyether ether ketone is sandwiched between sheets 2 and 3 of "Supral" superplastic aluminum alloy. Sheets 2 and 3 extend beyond the edges of sheet 1 and a coating of lubricant is applied between sheet 1 and the inner surfaces of sheets 2 and 3. A coating of adhesive or parting agent, as required, is also applied between sheet 1 and these inner surfaces. The edges of the metal sheets 2 and 3 extend beyond the edge of sheet 1 and the edges of the latter are free from constraint.

Figure 2:
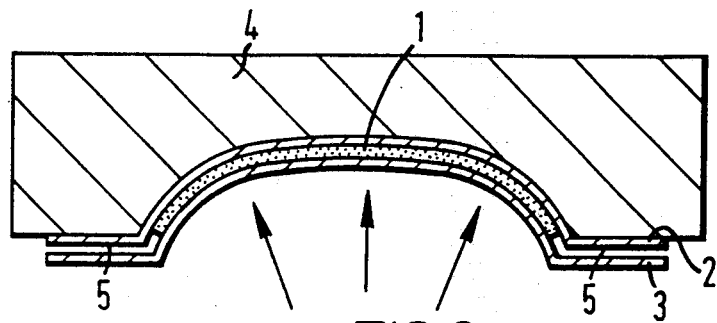
FIG. 2 shows schematically a method of deforming the sandwich of FIG. 1.

For deformation the sandwich is put in contact with a forming tool, heated to a temperature above 340° C., and deformed. One type of forming tool is shown schematically in FIG. 2. Using this tool, the planar heated sandwich is positioned on female mould 4 and its edges are clamped, by conventional clamping means, against the edges 5 of the mould. Fluid pressure, such as air pressure, is then applied in the direction shown by arrows so that the sandwich is deformed against the mould to take the shape shown in continuous lines.

Sheet 2 adjacent the mould surface may be perforated to allow escape of gases present in sheet 1 and the mould may be provided with vents (not shown) to allow escape of gases from the space between sheet 2 and the female mould surface. Alternatively the space between unperforated sheets 2 and 3 may be evacuated. The air pressure is maintained until the sandwich has cooled sufficiently to avoid delamination.

Figure 3:
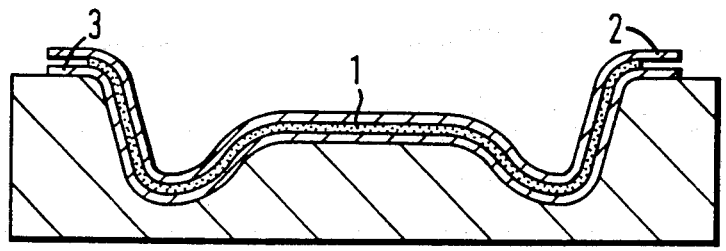
FIG. 3 shows schematically a method of deforming similar to that of FIG. 1, FIGS. 4 and 5 show schematically another method of deforming the sheet of FIG. 1.

The mould may take a variety of shapes for moulding differently shaped articles. One shape of mould allowing re-entrant curves to be produced is shown in FIG. 3. Deformation with this mould is carried out in the same way as in the mould of FIG. 2.

Figure 4:
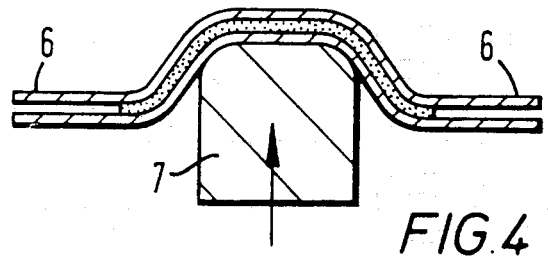
Figure 5:
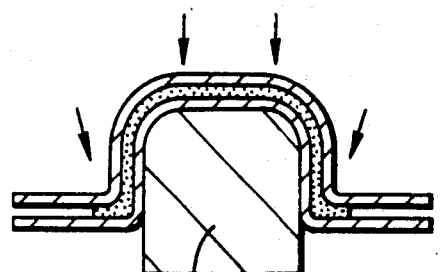

Another method of deformation is shown schematically by FIGS. 4 and 5. In this case the sandwich, heated to above 340° C., clamped at its edges 6, is deformed by mechanical force applied to the "plug" tool 7 so that the sandwich is deformed as shown in FIG. 4. Air pressure is then applied to the reverse surface of the sandwich as shown by arrows in FIG. 5 so that the sandwich is further deformed and assumes the shape defined by the plug. In this embodiment the metal sheet in contact with the plug may be perforated to allow escape of gas. Alternatively the space between unperforated sheets 2 and 3 may be evacuated. The plug tool 7 remains in place, and the air pressure is maintained, while the sandwich cools to a temperature at which delamination will not occur.

Figure 6:
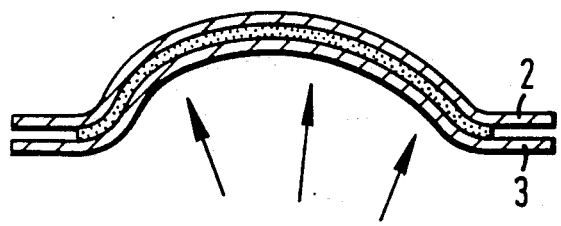
FIG. 6 shows a variant of the method of FIGS. 4 and 5.

The method shown in FIGS. 4 and 5 may be preceded by a "bubble blowing" step as shown in FIG. 6, in which air pressure is first applied to the surface of sheet 3 without any mould abutting sheet 2 and with the edges of the sandwich clamped. A male tool may then be inserted in the "bubble" formed, as shown in FIG. 4, and air pressure applied to sheet 2 as shown in FIG. 5. In this method the sandwich is deformed entirely by air pressure and no deforming force need be applied to the tool 7. As air pressure is applied to both sides of the sandwich neither of the sheets 2 and 3 should be perforated.

The operations described above may be carried out using shaping equipment which is in current use for deforming metal sheets. Instead of applying fluid pressure, the sandwich may be deformed by forces applied using solid dies. A wide variety of shapes of article may be produced, including articles having double curvature, that is curvature about two or more axes in the plane of the original flat sheet which are transverse to each other.

Figure 7:
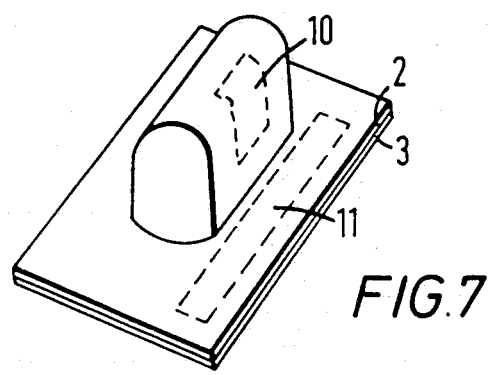
FIG. 7 shows an article which may be obtained using the methods described.

The methods described may be used for making shaped articles of composite which are attached on both, one or neither side to the metal sheets used in the deformation process. The methods described may be used for making articles from metal sheet adhered to the body of composite on only part of their surface. One such article is shown by way of example in FIG. 7. This article comprises the metal sheets, deformed as described above, with a patch 10 and a strip 11 of the composite material adhered to parts of their inside surfaces. This article may be made by the methods described above, using a sandwich in which only parts of the sheets 2 and 3 are separated by sheet 1.

Figure 8:
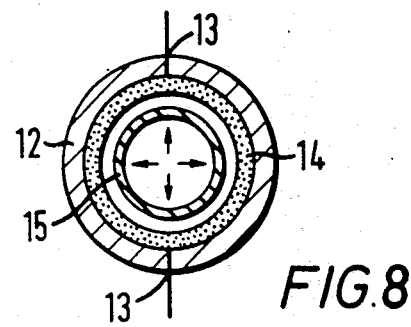
FIG. 8 shows schematically a method of making a tubular composite article.

FIG. 8 shows a method of making a tubular shaped body of fibre/plastics composite. A tubular mould 12, comprising a pair of half-moulds clamped together at 13 in known manner, is assembled and pieces of fibre/plastics pre-preg sheet are placed inside the mould to form a layer 14 adjacent its inside surface. The pieces of pre-preg sheet may be assembled together by known techniques such as circular braiding or use of part-circles. An inflatable, plastically deformable metal parison 15 is then inserted within the layer 14 and the assembly is heated to the temperature required for plastic deformation of the parison and pre-preg layer which pneumatic pressure is inserted within the parison to press the layer 14 against the mould wall. When layer 14 has consolidated into a firm tube the temperature of the assembly is lowered, the parison deflated and removed and the mould is opened to allow release of the tube. The mould 12 may be of circular, elliptical or any other cross-section depending on the desired cross-section of the composite tube.

Figure 9:
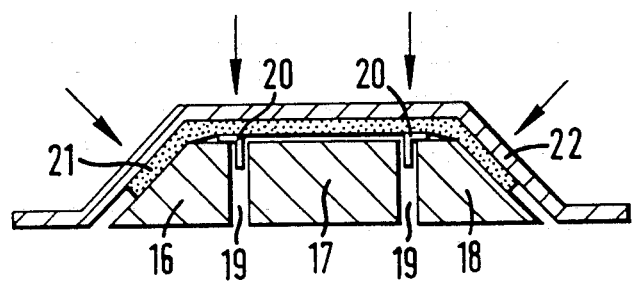
FIG. 9 shows schematically a method of making a composite article having upstanding members.

FIG. 9 illustrates a method of incorporating upstanding members, in this case brackets, in a surface of the composite body. The brackets are composed of the same material as the composite body. A mould is in three parts 16, 17 and 18 separated by gaps 19 in which the upstanding arms of brackets 20 of fibre/plastics composite sheet are inserted. A layer 21 of fibre/plastics composite is deposited on the mould surface, surrounding the parts of the brackets extending above the surface, and a sheet 22 of "Supral" alloy is placed in contact with the composite. On application of heat and pressure to the alloy sheet the composite material layer 21 is deformed and consolidated while parts 16 and 18 of the mould are pressed against part 17, compressing arms 20 of the brackets. On release of pressure from the sheet 21 the mould parts are separated from each other to release arms 20 from the mould.

Figure 10:
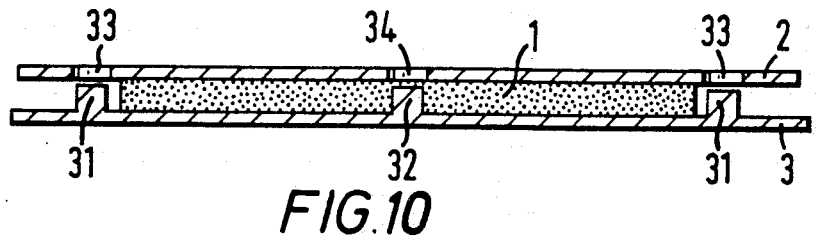
FIGS. 10 and 11 show schematically another method of deforming a sheet of composite material.
Figure 11:
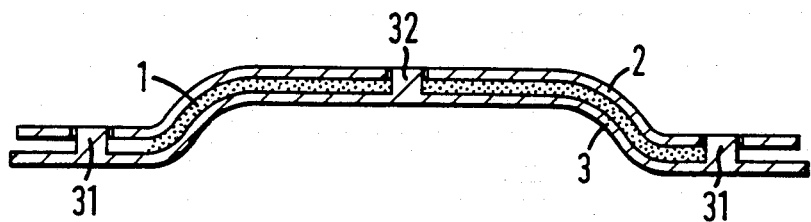

The method shown in FIGS. 10 and 11 is the same as that shown in FIG. 6. However in this method the sheet 3 is provided with outer and inner upstanding portions 31, 32 and sheet 2 is provided with holes or indents 33,34 opposite the upstanding portions. The upstanding portions are dimensioned to fit into the holes or indents when sheets 2 and 3 are brought together. As shown in FIG. 10, a layer of fibre-plastics composite is disposed between the sheets such that, on pressing, the outer upstanding portions 31 are located outside the composite layer by a short distance and the inner upstanding portion 32 defines a hole in the composite sheet. When deforming pressure is exerted on sheet 2, as shown in FIG. 11, the sheets 2 and 3 move together and the upstanding portions of sheet 3 enter the apertures of sheet 2. During this operation the layer 1, being under compression, is urged against the sides of the upstanding portions which consequently define edges of the shaped sheet of composite. The outer portions 31 define an outer edge of the sheet 1 and the inner portion 32 defines a hole in the sheet 1.

Using this method, by providing suitably arranged upstanding portions a sheet having any number of holes of any desired shape may be made and the sheet may have any desired peripheral shape, defined by outer portions 31. The outer upstanding portions may form a continuous barrier around the edge of sheet 1 to define the entire periphery of the sheet.

In a method similar to that of FIGS. 10 and 11, sheet 3 has equivalent upstanding portions but sheet 2 has a continuous surface which has no apertures. In this instance the upstanding portions abut the surface of sheet 2 without penetrating it and define the shape of the formed sheet in the same way as in the variant of FIGS. 10 and 11. This variant is applicable to sandwiches comprising only one sheet, in which case the upstanding portions on sheet 3 abut the surface of a mould instead of sheet 2.

Figure 12:
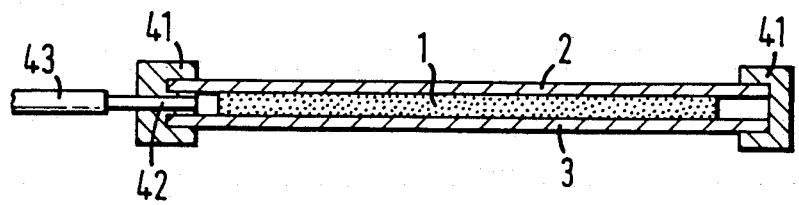
FIG. 12 shows yet another method of forming a composite material sheet.

FIG. 12 shows a method of forming the composite article in which the composite material is subjected to a vacuum during deformation to remove trapped gases. In this method a sandwich comprising composite layer 1 and sheets 2 and 3 is assembled as in FIG. 1, and is surrounded by a rigid gas-tight frame 41 engaging sheets 2 and 3 around their whole periphery to form a gas-tight enclosure. Frame 41 has at least one aperture 42 in communication with an end of umbilical tube 43. The other end of tube 43 is connected to a vacuum pump of known type (not shown in the drawing). After assembly as shown in FIG. 12 the enclosure is evacuated through tube 43 and the assembly is heated to the deformation temperature, and deformed by pressure applied to sheet 2, while the vacuum within the enclosure is maintained to remove gases present between sheets 2 and 3. The assembly may then be allowed to cool, the vacuum released and frame 41 removed.

We claim:

1. A method of forming a three dimensional shaped article of a plastics composite comprising superimposed layers of fibers dispersed in a matrix of a thermoformable material, comprising the steps of
    providing a body of said composite to be reshaped and having a first side and a second side;
    contacting at least the first side of said body of said composite with a sheet of a metal which is capable of being plastically deformed at an elevated temperature,
    clamping edges of said metal sheet to prevent movement of said edges during subsequent deformation, and applying vacuum to remove air from between said metal sheet and said body to bring the composite body tightly against the metal sheet and to provide support for said body;
    bringing the metal sheet and the composite body to an elevated temperature at which the metal sheet can be substantially plastically deformed and at which the composite body can conform to the plastically deformed shape of the metal sheet, and
    applying fluid pressure to the metal sheet while the second side of the composite body is at least partly reshaped by a mold so that the metal sheet becomes substantially plastically deformed to a relatively new deep shaped geometry and the first side of the composite body is formed to the relatively deep shaped new geometry by the plastic deformation of the metal sheet, including relative movement of the fibers of the superimposed layers to accommodate themselves to the new geometry without buckling, the shape of the plastics composite thereby obtained being defined on at least said first side by the plastic flow of the metal sheet.

2. A method according to claim 1, in which the thermoformable material is thermoplastic.

3. A method according to claim 1, in which the thermoformable material is thermosettable.

4. A method according to claim 1, in which the body of composite comprises a sheet of thickness from 0.25 mm to 25 mm.

5. A method according to claim 1, in which the body of composite comprises a pre-formed consolidated plastics sheet containing said superimposed layers of fibres and the composite sheet is curved about at least one axis in the plane of the composite sheet when the metal sheet is urged against the body.

6. A method according to claim 1, in which the body of composite comprises an assembly of prepreg sheets and the prepreg sheets are consolidated together when the metal sheet is urged against the body.

7. A method according to claim 1, in which the metal sheet is superplastic.

8. A method according to claim 1, in which the body comprises a plurality of separate pieces of said composite and the pieces are joined together when the sheet is urged against the body.

9. A method according to claim 1, in which the metal sheet comprises an inflatable diaphragm or parison.

10. A method according to claim 1, in which the body is positioned directly between the metal sheet and a surface of said mould and the metal sheet is deformed when urged against the body to press the body against the mould surface.

11. A method according to claim 10, in which the mould surface is provided with apertures, members to be attached to the body are placed in the apertures and the members become attached to the body when the body is pressed against the mould surface.

12. A method according to claim 1, in which the metal sheet has at least one upstanding portion extending into or around the body when the sheet is urged against the body, said upstanding portion defining an edge of the shaped article extending in the direction transverse to the sheet.

13. A method according to claim 12, in which the body is positioned between said metal sheet and another deformable sheet which has an aperture opposite said upstanding portion, the upstanding portion entering the aperture when said metal sheet is urged against the body.

14. A method according to claim 1, in which a lubricant is applied between the surface of the metal sheet and the body.

15. A method according to claim 1, in which a layer of material is interposed between the metal sheet and the body and said material becomes adhered to the shaped article on urging of the sheet against the body.

16. A method according to claim 1, in which an adhesive is applied between the surface of the metal sheet and the body and the sheet is adhered to the body when urged against the body.

17. A method according to claim 1, in which at least one member to be attached to the body is positioned in contact with the body and becomes attached to the body on plastic deformation of the sheet to shape the body.

18. A method of forming a shaped article of a plastics composite comprising fibers dispersed in a matrix of a thermoformable material, comprising the steps of
providing a body of said composite to be reshaped and having a first side and a second side;
confining both said first and second sides of said body of said composite between sheets of metal which are capable of being plastically deformed at an elevated temperature;
restraining the edges of said metal sheets;
bringing said metal sheets and the body to an elevated temperature at which the metal sheets can be plastically deformed and at which the body can conform to the shape of the metal sheets;
applying fluid pressure to one of the metal sheets at such a pressure so that the metal sheets are plastically stretched relative to the restrained edges and the body is formed to shape between the stretched metal sheets, the shape of the plastics composite thereby obtained being defined by the plastic flow of the metal sheets; and
separating the stretched metal sheets from the resultant shaped article.

19. A method according to claim 18, in which one of said sheet is perforate to allow gases trapped between the sheets to escape.

20. A method according to claim 18, in which the space between said metal sheets is evacuated to remove gases between the sheets.

21. A method according to claim 20, in which the peripheries of the sheets are joined by a rigid gas-tight frame to form an enclosure surrounding the body, the frame having an aperture and means for creating a vacuum in the enclosure are connected to the aperture, a vacuum is established in the enclosure and said metal sheet is urged against the body while the vacuum is maintained in the enclosure.

22. A method according to claim 21, in which after deformation of the sheets and body the vacuum in the enclosure is maintained while the body is allowed to cool.

* * * * *